(12) United States Patent  (10) Patent No.: US 8,677,448 B1
Kauffman et al.  (45) Date of Patent: Mar. 18, 2014

(54) GRAPHICAL USER INTERFACE INCLUDING USAGE TRENDING FOR SENSITIVE FILES

(75) Inventors: Sally Kauffman, Washington, DC (US); Philip Sarin, Pittsburg, PA (US); Himanshu Bari, Fremont, CA (US); Adam Jackson, San Francisco, CA (US); Jeremy Mailen, San Francisco, CA (US); Harold Byun, Belmont, CA (US); Pritesh Sharma, San Francisco, CA (US); Alan Galindez, Milpitas, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 13/324,986

(22) Filed: Dec. 13, 2011
(Under 37 CFR 1.47)

Related U.S. Application Data

(60) Provisional application No. 61/423,053, filed on Dec. 14, 2010.

(51) Int. Cl.
*G06F 17/00* (2006.01)

(52) U.S. Cl.
USPC .................................................. 726/1; 726/2

(58) Field of Classification Search
None
See application file for complete search history.

(56) References Cited

U.S. PATENT DOCUMENTS

| | | | |
|---|---|---|---|
| 8,201,257 B1 | 6/2012 | Andres et al. | |
| 8,321,560 B1 * | 11/2012 | Pai et al. | 709/224 |
| 2003/0046128 A1 | 3/2003 | Heinrich | |
| 2005/0030952 A1 | 2/2005 | Elmasry et al. | |
| 2005/0193250 A1 | 9/2005 | Takeuchi et al. | |
| 2006/0020814 A1 | 1/2006 | Lieblich et al. | |
| 2006/0085836 A1 * | 4/2006 | Lyons et al. | 726/1 |
| 2006/0259336 A1 | 11/2006 | Anas et al. | |
| 2007/0143827 A1 | 6/2007 | Nicodemus et al. | |
| 2007/0143851 A1 | 6/2007 | Nicodemus et al. | |
| 2008/0168529 A1 * | 7/2008 | Anderson et al. | 726/1 |
| 2010/0125911 A1 | 5/2010 | Bhaskaran | |
| 2010/0162347 A1 | 6/2010 | Barile | |
| 2010/0281543 A1 | 11/2010 | Golomb et al. | |
| 2011/0047594 A1 | 2/2011 | Mahaffey et al. | |
| 2011/0305329 A1 | 12/2011 | Zoldi et al. | |
| 2012/0023586 A1 | 1/2012 | Flickner et al. | |
| 2012/0102543 A1 | 4/2012 | Kohli et al. | |
| 2012/0110174 A1 | 5/2012 | Wootton et al. | |
| 2012/0240236 A1 | 9/2012 | Wyatt et al. | |
| 2013/0086682 A1 | 4/2013 | Mahaffey et al. | |

OTHER PUBLICATIONS

USPTO; Office Action for U.S. Appl. No. 13/038,232, mailed Sep. 12, 2012.

(Continued)

*Primary Examiner* — Brandon Hoffman
*Assistant Examiner* — Nega Woldemariam
(74) *Attorney, Agent, or Firm* — Lowenstein Sandler LLP

(57) ABSTRACT

Sensitive file accessing trends can be visually represented. In one embodiment, the present invention includes receiving, in a graphical user interface (GUI), a first user input indicating a selection of one folder from a plurality of folders, and identifying a plurality of sensitive files in the selected folder using one or more data loss prevention policies. In one embodiment access usage data for the sensitive files can be obtained and the number of users accessing the sensitive files within a plurality of time intervals can be determined using the access usage data. Finally, a usage trend representation comprising a visual illustration of the number of users accessing the sensitive files within each of the plurality of time intervals can be displayed to a user.

20 Claims, 8 Drawing Sheets

(56) References Cited

OTHER PUBLICATIONS

USPTO; Office Action for U.S. Appl. No. 13/038,232, mailed Jan. 29, 2013.

USPTO; Notice of Allowance for U.S. Appl. No. 13/038,232, mailed Apr. 16, 2013.

Cooley, Albert; "How IBM's new database security and monitoring software helps protect sensitive information and reduce compliance costs," Infosphere Guardium, IBM Corporation, <http://public.dhe.ibm.com/common/ssi/ecm/en/im114024usen/IM114024USEN.PDF>, 2010, pp. 1-4.

Kanagasingham et al., "Data Loss Prevention", <http://sans.org/reading_room/whitepapers/dlp/data-loss-prevention_32883>, Aug. 15, 2008, pp. 1-38, SANS Institute.

Li et al., "Towards Security Vulnerability Detection by Source Code Model Checking", <http://ieeexplore.ieee.org/stamp/stamp.jsp?tp=&arnumber=5463672>; Apr. 7-9, 2010, pp. 1-7.

Securosis, LLC., "Understanding and Selecting a Data Loss Prevention Solution", <https://securosis.com/assets/library/reports/DLP-whitepaper.pdf>. (cited by USPTO in Office Action for U.S. Appl. No. 13/038,232, mailed Jan. 29, 2013), pp. 1-26, SANS Institute.

Securosis, LLC., "The Business Justification for Data Security", <http://www.sans.org/reading_room/whitepapers/dlp/business-justification-data-security_33033>, Jan. 26, 2009, pp. 1-40, SANS Institute.

\* cited by examiner

GRAPHICAL USER INTERFACE INCLUDING USAGE TRENDING FOR SENSITIVE FILES

RELATED APPLICATIONS

This application claims the benefit of U.S. Provisional Patent Application Ser. No. 61/423,053, filed Dec. 14, 2010, which is hereby incorporated by reference. This application is also related to U.S. patent application Ser. No. 13/038,232 filed Mar. 1, 2011.

FIELD

Embodiments of the invention relate to data loss prevention, and more particularly to a graphical user interface for a data loss prevention system.

BACKGROUND

Data Loss Prevention (DLP) involves computer and information security, where DLP systems identify, monitor, and protect data in use (e.g., endpoint actions), data in motion (e.g., network actions), and data at rest (e.g., data storage). Typically, a DLP system creates fingerprints of confidential information that requires protection, and then uses the fingerprints to detect the presence of confidential information in various files, messages and the like. Confidential information may be stored in a structured form such as a database, a spreadsheet, etc., and may include, for example, customer, employee, patient or pricing data. In addition, confidential information may include unstructured data such as design plans, source code, CAD drawings, financial reports, etc.

Many organizations store large amounts of confidential information in files that are accessible to users within the organization. Since access to this data is essential to the job function of many users within the organization, there are many possibilities for theft or accidental distribution of this confidential information. Theft or benign inadvertent disclosure of confidential information represents a significant business risk in terms of the value of the intellectual property and compliance with corporate policies, as well as the legal liabilities related to government regulatory compliance. However, with a large number of files and users, it is difficult to assess which confidential files have a high risk of distribution and need to be remediated quickly.

SUMMARY

In one embodiment, a method is provided that comprises receiving, in a graphical user interface (GUI), a first user input indicating a selection of one folder from a plurality of folders; identifying a plurality of sensitive files in the selected folder using one or more data loss prevention policies; obtaining access usage data for the sensitive files; determining the number of users accessing the sensitive files within a plurality of time intervals using the access usage data; and displaying, in the GUI, a usage trend representation comprising a visual illustration of the number of users accessing the sensitive files within each of the plurality of time intervals. In one embodiment, the time intervals comprise months, and wherein the usage trend representation visually illustrates the number of users accessing the sensitive files per month. In one embodiment, the usage trend representation has a range of one year. In one embodiment, wherein the usage trend representation comprises a graph.

In one embodiment, the method further comprises receiving a second user input indicating the selection of one or more filter criteria; filtering the plurality of sensitive files according to the one or more filter criteria; re-determining the number of users accessing the filtered sensitive files within a plurality of time intervals using the access usage data; and displaying, in the GUI, a usage trend representation comprising a visual illustration of the number of users accessing the filtered sensitive files within each of the plurality of time intervals. In one embodiment, the usage trend representation further includes a baseline access trend indication visually illustrating the average number of users accessing the unfiltered sensitive files.

In one embodiment, the method further comprises identifying the plurality of sensitive files in the selected folder using one of more data loss prevention policies comprises using a data loss prevention (DLP) system to scan the selected folder using data sensitivity rules of the one or more data loss prevention policies. In one embodiment, obtaining access usage data for the sensitive files comprises retrieving the access usage data from a data permission and access system.

In one embodiment, the method further comprises identifying one or more data owners that own the most number of sensitive files in the plurality of sensitive files, and displaying, by the GUI, a visual association of each of the identified one or more data owners with the number of sensitive files owned by each identified data owner. In one embodiment, the method further comprises displaying, by the GUI, a visual association of each of the identified one or more data owners with a link to an incident report providing information about policy violations associated with sensitive files owned by an identified data owner. In one embodiment, the method further comprises displaying, in the GUI, the plurality of folders sorted by a risk score associated with each folder in the plurality of folders. In one embodiment, the method further comprises displaying, in the GUI, a risk summary associated with each folder in the plurality of folders, each risk summary including a graphical representation of the numbers of violations of the one or more data loss prevention policies by files contained in the folder.

In one embodiment, a non-transitory computer readable storage medium is provided that provides instructions, which when executed on a computer system cause the computer system to perform a method comprising receiving, in a graphical user interface (GUI), a first user input indicating a selection of one folder from a plurality of folders; identifying a plurality of sensitive files in the selected folder using one or more data loss prevention policies; obtaining access usage data for the sensitive files; determining the number of users accessing the sensitive files within a plurality of time intervals using the access usage data; and displaying, in the GUI, a usage trend representation comprising a visual illustration of the number of users accessing the sensitive files within each of the plurality of time intervals.

In one embodiment, a system is provided, the system comprising a memory and a processor coupled with the memory to receive, in a graphical user interface (GUI), a first user input indicating a selection of one folder from a plurality of folders; identify a plurality of sensitive files in the selected folder using one or more data loss prevention policies; obtain access usage data for the sensitive files; determine the number of users accessing the sensitive files within a plurality of time intervals using the access usage data; and display, in the GUI, a usage trend representation comprising a visual illustration of the number of users accessing the sensitive files within each of the plurality of time intervals.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 28 is a block diagram of one embodiment of a risk calculation system;

DETAILED DESCRIPTION

A method and apparatus for visually representing usage trend of sensitive data are described. Embodiments of the present invention provide a user interface configured to display a usage trend graph visually illustrating usage of sensitive files in a folder being analyzed. As a result, the user can notice usage trends warranting further investigation or actions.

In the following description, numerous details are set forth. It will be apparent, however, to one of ordinary skill in the art having the benefit of this disclosure, that embodiments of the present invention may be practiced without these specific details.

Figure 1:
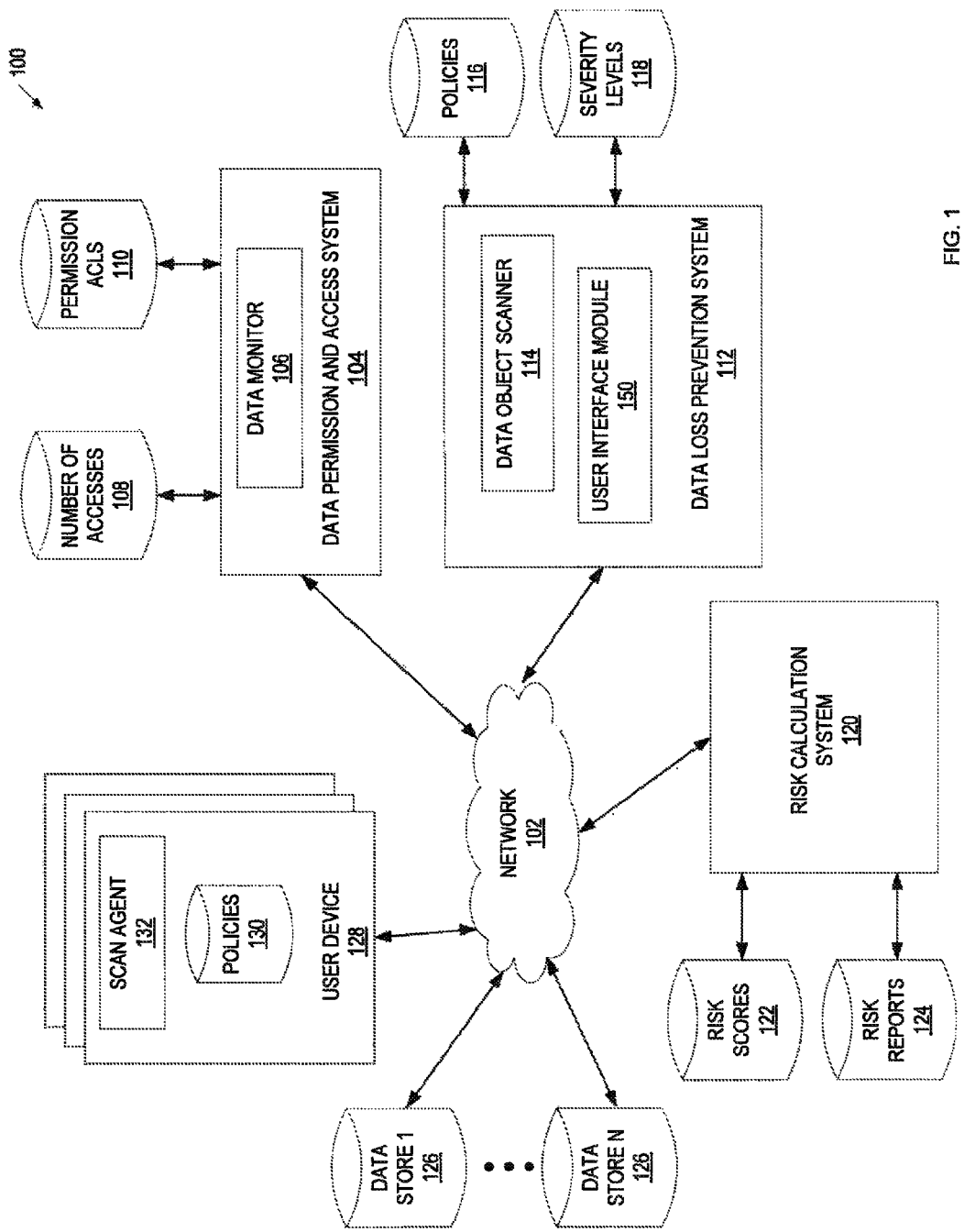
FIG. 1 illustrates an exemplary network architecture in which embodiments of the invention may operate.

FIG. 1 is a block diagram of an example network architecture 100, in which embodiments of the present invention may operate. The network architecture 100 may include a data permission and access system 104, a data loss prevention system 112, a risk calculation system 120, and one or more user devices 128 coupled via a network 102 (e.g., public network such as the Internet or private network such as a local area network (LAN)). The user devices 128 may include personal computers, laptops, PDAs, mobile phones, network appliances, etc.

The data permission and access system 104, the data loss prevention system 112, and the risk calculation system 120 may reside on the same or different machines (e.g., a server computer system, a gateway, a personal computer, etc.). They may run on one Local Area Network (LAN) and may be incorporated into the same physical or logical system, or different physical or logical systems.

Alternatively, data permission and access system 104, the data loss prevention system 112, and the risk calculation system 120, and user devices 128 may reside on different LANs that may be coupled together via the Internet but separated by firewalls, routers, and/or other network devices. In yet another configuration, the data loss prevention system 112 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The network architecture 100 further includes data stores 126 coupled to the network 102. The data stores 126 may represent a single or multiple data structures (databases, repositories, files, etc.) residing on one or more mass storage devices, such as magnetic or optical storage based disks, tapes, or hard drives. The data stores 126 may store any kind of data pertaining to the operation of an organization including emails, shared workspaces, etc. The data stores 126 can be centralized data repositories that may contain confidential documents and therefore need to be protected by data loss prevention system 112. The data stores 126 may be, for example, part of a network-attached storage (NAS) system or a storage area network (SAN) system.

The data loss prevention system 112 protects confidential information maintained by an organization. Confidential information may be stored in a structured form such as a database, a spreadsheet, etc., and may include, for example, customer, employee, patient or pricing data. In addition, confidential information may include unstructured data such as design plans, source code, CAD drawings, financial reports, human resources reports, customer or patient reports, pricing documentation, corporate mergers and acquisitions documentation, government (e.g. Securities and Exchange Commission) filings, and any other confidential information that requires restricted user access. The data loss prevention system 112 protects confidential information using DLP policies 116, A DLP policy includes rules for scanning content to detect the presence of confidential information. The content to be scanned may be stored in centralized data repositories such as data stores 126 that may potentially contain documents with confidential information. In addition, the content to be scanned may include documents associated with a client device such as user devices 128. Documents associated with a user device 128 may include documents stored locally on user device 128 and network-based documents stored for user device 128 (e.g., as part of NAS or SAN system). A document can be a file, a message, a web request or any other data item that is stored on a storage medium and is accessible using a name or any other identifier.

Data loss prevention system 112 may also instruct scan agents 132 located on one or more of the user devices 128 to scan documents stored locally for confidential information. Data loss prevention system 112 may do this according to one or more of the DLP policies 130.

When monitoring content for the presence of confidential information, the data loss prevention system 112 may use fingerprints of the source data to facilitate more efficient searching of the content. Fingerprints may include hashes of source data, encrypted source data, or any other signatures uniquely identifying the source data. The data loss prevention system 112 may distribute fingerprints to scan agents 132, and scan agents 132 may use fingerprints when scanning documents for confidential information in accordance with one or more DLP policies 130. Data object scanner 114 in the data loss prevention system 112 may use fingerprints when scanning documents for confidential information in accordance with one or more DLP policies 116.

A policy may include a set of rules that specify what confidential information (e.g., confidential data stored in a secure repository or a secure database) needs to be present in the content being scanned in order to trigger a policy violation. In addition, policies may specify when particular content should be scanned, which content (e.g., files accessible to employees of an organization or email messages stored on a mail server of the organization) should be scanned, etc. Further, policies may specify which actions should be taken when the documents being scanned contain confidential information. For example, the policy may require that access to the content be blocked, reported, etc. Data loss prevention system 112 creates DLP policies 116 (e.g., based on user input or based on relevant regulations) and distributes relevant DLP policies to various entities. For example, DLP policies 130 pertaining to scanning content stored on user devices 128 are distributed to user devices 128. DLP policies 116 pertaining to scanning content stored in centralized data stores 126 may be stored locally for use by the data object scanner 114.

An organization may maintain multiple data stores 126 and may store a large number of documents in each data store 126. The stored documents may be frequently modified by different employees of the organization and new documents may be often added to the data stores 126. Hence, DLP policies 116 may request that data stores 126 be scanned frequently to prevent loss of confidential information.

In one embodiment, a DLP policy violation in a scanned document triggers an incident. Once an incident is triggered, the document is assigned a severity level by data object scanner 114 of the DLP system 112. In some embodiments, the higher the severity level, the greater the business risk of losing the document or having the contents of the document be exposed to unauthorized users. In one embodiment, the severity level can be assigned by determining the importance of the rule in the DLP policy 116 violated by the document. The importance of the rule may be specified by a user. In an alternate embodiment, the severity level can be determined based on the number of DLP policies violated by the document. In some embodiments, each incident triggered by a DLP violation can be assigned a severity level. In some embodiments, the severity level for a document can be an aggregation of the severity levels for each incident related to the document (e.g., sum of all severity levels, product of all severity levels, etc.). In some embodiments, the severity level can be determined by the sensitivity or confidentiality of the content in the document. In some embodiments, the severity level for an incident can be determined by the context in which the incident happened (e.g., specific protocols, users, groups of people, devices involved, etc.). The severity level for the document can be stored in severity levels store 118. In one embodiment, the severity level is a numerical value with a predetermined range (e.g., 1 through 4). In one embodiment, the predetermined range for the severity level can be configured by a user of the data loss prevention system 112. In some embodiments, when an incident is triggered, a number of incidents associated with the document can be incremented and stored with the severity level. In some embodiments, when an incident is triggered, a determination can be made of whether a hazard is associated with the incident. A hazard refers to combination of a document and a policy violated by the document. If a hazard is not associated with the incident, a new hazard can be created for the combination of the document and the policy violated by the document. In some embodiments, there may be only one hazard for a document and policy violation combination.

Data permission and access system 104 contains data monitor 106. Data monitor 106 can monitor documents stored in centralized data repositories such as data stores 126 or documents associated with a client device such as user devices 128. In one embodiment, data monitor 106 can monitor the documents for accesses of the documents. In one embodiment, if a document is accessed, e.g., by a user or by an application, data monitor 106 can store information associated with the access in storage, such as number of accesses store 108. Such information can include a timestamp associated with the access. In one embodiment, the data permission and access system 104 can maintain access statistics—for example in the number of accesses store 108—such as the number of users who have accessed the document or its content over a predetermined amount of time (e.g., 7 days), over its lifetime, or per some predetermined time interval (such as a month) over some period of time (such as a year). In an alternate embodiment, the information associated with the access in storage can include the number of accesses for the document or its content over a predetermined amount of time (e.g., 7 days), over its lifetime, or per some predetermined time interval (such as a month) over some period of time (such as a year). In one embodiment, the predetermined time interval or amount of time can be configurable by a user. In one embodiment, when a document is accessed, data monitor 106 can cause a number of accesses to be incremented for the document.

In one embodiment, data monitor 106 can monitor changes in a permission access control list (ACL) associated with each of the documents. A permission ACL can define the permissions for the document. For example, the permission ACL for a document can define the number of users who are permitted to access the document or its contents. In one embodiment, data monitor 106 can store the permission ACL in permission ACLs store 110.

Risk calculation system 120 can calculate a risk score for a folder that has been scanned by data loss prevention system 112. The folder can contain one or more files. The terms documents and files are used interchangeably herein, and can include any stored data items, including messages, message attachments, requests, and files.

In one embodiment, the risk score can be calculated for each of the files in the folder, and then aggregated together to calculate a risk score for the folder. In an alternate embodiment, the risk score can be calculated for each hazard in the folder, and then aggregated together to calculate a risk score for the folder. For each file or hazard in the folder, risk calculation system 120 can obtain the severity level associated with the file or hazard. If the risk calculation system 120 obtains the severity level associated with the hazard, risk calculation system 120 may first determine a file associated with the hazard. In one embodiment, risk calculation system 120 may obtain the severity level for a file from severity levels store 118 maintained by data loss prevention system 112.

Data loss prevention system can access severity levels store 118 to obtain the severity level for the file, and can provide the obtained severity level to risk calculation system 120. In certain embodiments, additional data (metadata) can be obtained for each file by risk calculation system 120. In one such embodiment, the additional data may be the permission ACL for each file. In this embodiment, risk calculation system 120 may obtain the permission ACL from data permission and access system 104.

Data permission and access system 104 can access permission ACLs store 110 to obtain the permission ACL for the file, and can provide the obtained permission ACL to risk calculation system 120, which then determines how many users are allowed access to the file. In another such embodiment, the additional data may be the number of accesses for each file. In this embodiment, risk calculation system 120 may obtain the number of accesses from data permission and access system 104. Data permission and access system 104 can access number of accesses store 108 to obtain the number of accesses for the file, and can provide the obtained number of accesses to risk calculation system 120. In yet another such embodiment, the additional data may be both the number of users in the access control list and number of accesses for each file.

Using the severity levels and the additional data, a risk score can be calculated for each file. The risk score for the folder is calculated by aggregating the risk scores for the files. In one embodiment, the risk score for each file and the risk score for the folder is stored in risk scores store 122. In one embodiment, a risk report is created using the risk score for a folder. The risk report may be stored in risk reports store 124.

In one embodiment, the DLP system 112 includes a user interface module 150 that provides a graphical user interface (GUI) that utilizes data from the various systems described. Such a graphical interface can be a browser interface or an interface provided by a dedicated application. Alternatively, the GUI module 150 can be part of the data permission and access system 104, or the risk calculation system 120. Yet alternatively, the GUI module 150 may be part of a different system hosted by a separate machine and can interact with the above systems to obtain data from the various data stores associated with these systems.

In collaboration with the DLP system 112, the user interface module 150 can respond to user inputs—such as the selection of a folder—to collect information about the user-selected items and generate charts, graphs, and workflows related to those items. In one embodiment, the user interface module 150 can use information from the risk calculation system 120 to sort and filter the display of folders containing files. Furthermore, the user interface module 150 can access information from the data permissions and access system 104 and generate access trend graphs and other graphical representations related to files determined to be sensitive by the DLP system 112.

Figure 2A:
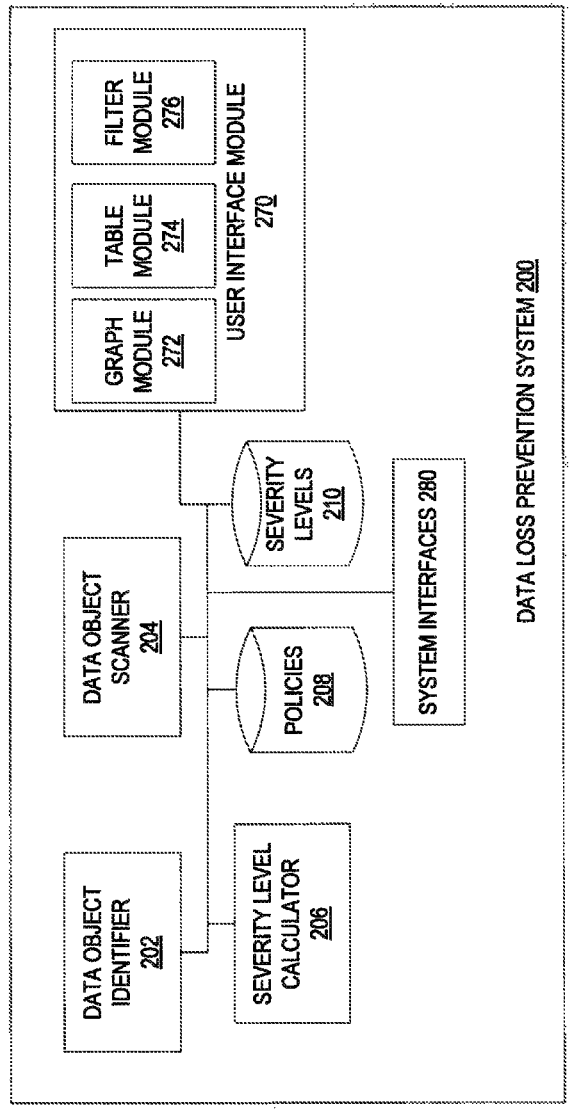
FIG. 2A is a block diagram of one embodiment of data loss prevention system.

FIG. 2A is a block diagram of one embodiment of a data loss prevention system 200. The data loss prevention system 200 may include data object identifier 202, data object scanner 204, severity level calculator 206, policies store 208, and severity levels store 210. The components of the data loss prevention system may represent modules that can be combined together or separated into further modules, according to some embodiments.

The data object identifier 202 may identify data objects, or documents, that are to be scanned for confidential information. In some embodiments, the data objects to be scanned may be part of a centralized data repository and are to be scanned over a network. In some embodiments, data object identifier 202 may receive a request to scan the data objects from a risk calculation system in accordance with one or more DLP policies. In other embodiments, data object identifier 202 may receive a request to scan the data objects from a controller in accordance with one or more DLP policies. The data objects to be scanned may be one or more directories of documents, part of a directory of documents, etc.

Data object scanner 204 may scan data objects that data object identifier 202 has identified to be scanned. In some embodiments, data object identifier 202 can scan the data objects for confidential information using fingerprints of data objects that have been classified as containing confidential information. In one embodiment, data object scanner 204 may scan the data objects in accordance with at least one DLP policy. Data object scanner 204 may retrieve the DLP policy from policies store 208.

Severity level calculator 206 calculates the severity level of a data object on which an incident is triggered. An incident may be triggered for a data object when a scan of the data object determines that the data object violates a DLP policy. In some embodiments, the severity level assigned to the data object may be based on the sensitivity or confidentiality of the content in the data object. In some embodiments, the higher the severity, the greater the business risk of losing the data object or having the contents of the data object be exposed to unauthorized users. In one embodiment, the severity level can be assigned by determining the importance of the rule in the DLP policy violated by the data object. In an alternate embodiment, the severity level can be determined based on the number of DLP policies violated by the data object. In another alternate embodiment, the severity level can be assigned by determining a number of incidents (policy violations) for the data object and normalizing the value to a predetermined range (e.g., 1-4). For example, if a data object has a high number of incidents associated with it (e.g., 20), a higher severity level (e.g., 4) may be assigned to a data object. In another example, if a data object has a low number of incidents associated with it (e.g., 2), a lower severity level (e.g., 1) may be assigned to the data object. The severity level of a data object can be stored in severity levels store 210.

In one embodiment, the DLP system 200 includes system and network interfaces 280 to enable communications with and information retrieval from the other components, such as the risk calculation system 120 and the data permission and access system 104. The user interface module 270 can respond to user inputs and display information to users of the DLP system 200. In one embodiment, the user interface module 270 includes a graph module 272. The graph module 272 can generate a usage trend representation and display it to a user in the form of a graphical illustration.

In one embodiment, the user interface 270 displays a list of folder to the user. The folders can be sorted by risk scores for example, which can be obtained from the risk calculation system 120 via the system interfaces 280. When a folder is selected, the user interface module 270 can use the data object identifier 202 and the data object scanner 204 to identify the sensitive files in the folder. Access data relating to the sensitive files can be obtained by the user interface module 270 from the data permission and access system 104 via the system interfaces 280. The graph module 270 can then generate the usage trend representation for the sensitive files using the obtained access date.

The user interface 270 can also include a table module 274 that can use the access and permissions data obtained form the data permission and access system 104 to identify top data owners and to visually associate the top owners of sensitive data with the number of sensitive files in the folder each owns. The table module 274 can further visually associate each of the top sensitive data owners with a link to a detailed incident report for each data owner. This visual representation can be in the form of a table.

The user interface can also include a filter module 276 configured to accept different filter criteria on which to filter and sort the files of a folder. For example, the user can select a specific policy or set of policies to filter on using the filter module 276. The filter module 276 then filters the results of the data object scanner 204 to only scan for sensitive files under the user-selected policies. The filtered results can then be used to update the graphs and tables generated by the graph module 272 and the table module 274 respectively. Several embodiments of the user interface module 270, the graph module 272, the table module 274, and the filter module 276 are described in greater detail further below with reference to FIGS. 5-6.

Figure 2B:
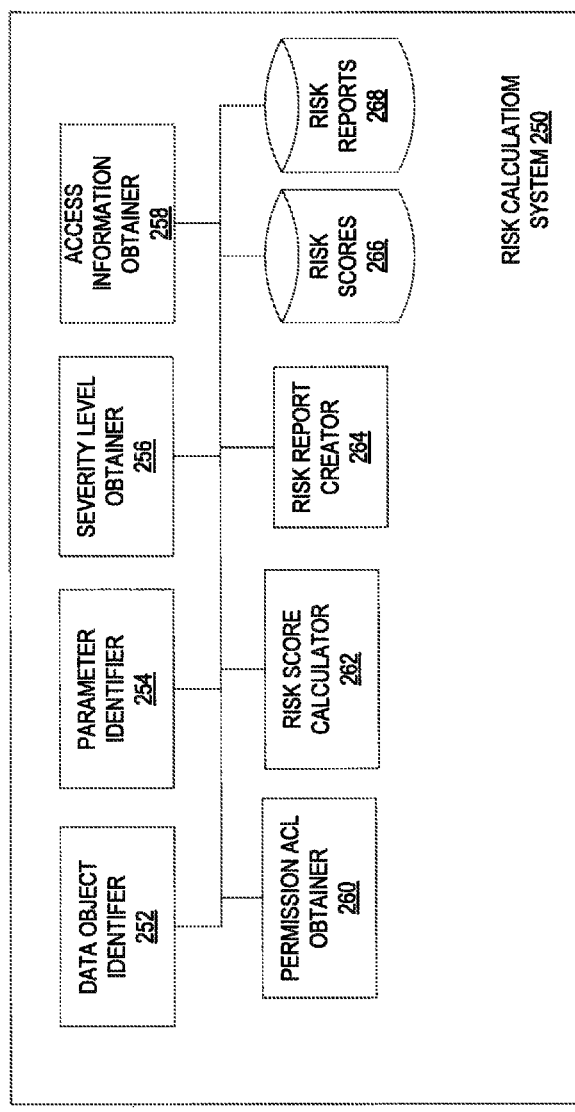

FIG. 2B is a block diagram of one embodiment of a risk calculation system 250. The risk calculation system 250 may include data object identifier 252, parameter identifier 254, severity level obtainer 256, access information obtainer 258, permission ACL obtainer 260, risk score calculator 262, risk report creator 264, risk scores store 266, and risk reports store 268. The components of the risk calculation system may represent modules that can be combined together or separated into further modules, according to some embodiments.

The data object identifier 252 may identify data objects that require calculation of a risk score. In some embodiments, a calculation of the risk score is performed at predefined times for a folder. In some embodiments, a calculation of the risk score is performed when a file in a folder is modified. In some embodiments, a calculation of the risk score is performed when a file in a folder triggers an incident. In some embodiments, a user requests a risk score for a data object that is a folder. The data object identifier 252 may identify one or more files or hazards in the folder. If data object identifier 252 identifies hazards in the folder, data object identifier 252 may identify a file associated with each hazard. In some embodiments, the data object may be part of a centralized data repository and the risk score is to be calculated over a network.

Parameter identifier 254 may identify one or more configuration parameters to use in the calculation of the risk score for the data object. In some embodiments, a user can set the values of the configuration parameters. In some embodiments, the configuration parameters can include coefficients for the calculation of the risk score. In some embodiments, the configuration parameters can determine which data values may be used in the calculation of the risk score. In some embodiments, the configuration parameters can determine the operation used to calculate the risk score. In some embodiments, none or some of the configuration parameters may be set by a user. In these embodiments, a default set of configuration parameters can be used when calculating the risk score.

Severity level obtainer 256 obtains the severity level associated with a data object on which the risk score calculation is to be performed. In some embodiments, the severity level can be obtained from a data loss prevention system. In some embodiments, the number of incidents for a data object can be obtained along with the severity level for the data object. An incident may be triggered for a data object because a scan of the data object determines that the data object violates a DLP policy. In some embodiments, the severity level assigned to the data object may be based on the sensitivity or confidentiality of the content in the data object. In some embodiments, the higher the severity, the greater the business risk of losing the data object or having the contents of the data object be exposed to unauthorized users. In one embodiment, the severity level can be assigned by determining the importance of the rule in the DLP policy violated by the data object. In an alternate embodiment, the severity level can be determined based on the number of DLP policies violated by the data object. In another alternate embodiment, the severity level can be assigned by determining a number of incidents for the data object and normalizing the value to a predetermined range (e.g., 1-4).

Access information obtainer 258 obtains the access information associated with a data object on which a risk score is to be calculated. In some embodiments, the access information can be obtained from a data permission and access system. In some embodiments, the access information for a data object can represent a number of times that the data object or its content has been accessed by one or more users during a predetermined period of time. In one embodiment, the predetermined period of time can be configurable by a user.

Permission ACL obtainer 260 can obtain the permission ACL associated with a data object on which a risk score is to be calculated. In some embodiments, the permission ACL information can be obtained from a data permission and access system. In some embodiments, the permission ACL for a data object specifies a number of users who are permitted to access the document or its contents.

Risk score calculator 262 can calculate a risk score for a data object identified by data object identifier 252. In one embodiment, if the data object is a folder, risk score calculator 262 can calculate a risk score for each file in the folder, and may aggregate the risk scores of the files to calculate a risk score for the folder. In an alternate embodiment, risk score calculator 262 can calculate a risk score for each hazard in the folder, and then aggregated together to calculate a risk score for the folder. In some embodiments, risk score calculator 262 can calculate the risk score based only on the severity level associated with the data object obtained from severity level obtainer 256. In some embodiments, risk score calculator 262 can calculate the risk score based on the severity level associated with the data object and additional data. In one such embodiment, the additional data may be the permission ACL for the data object obtained from permission ACL obtainer 260. In another such embodiment, the additional data may be the number of accesses for the data object obtained from access information obtainer 258. In yet another such embodiment, the additional data may be both the permission ACL for the data object and number of accesses for the data object. Using the severity level for the data object and the additional data for the data object, a risk score can be calculated for the data object. In some embodiments, the calculation of the risk score can be adjusted by risk score calculator 262 based on the configuration parameters identified by parameter identifier 254. In some embodiments, the risk score may be calculated by summing the severity level and the additional data. In other embodiments, the risk score may be calculated by multiplying the severity level and the additional data. In some embodiments, coefficients are used for the components (e.g., severity level, ACL, number of accesses) involved in the risk score calculation. The risk score of a data object can be stored in risk scores store 266. If the data object is a folder, the risk score of each file in the folder can be stored in risk scores store 266, in addition to the risk score for the folder being stored in risk scores store 266.

Risk report creator 264 can create a risk report using the risk score for a data object. In some embodiments, the risk report can include the risk score for folders selected by a user without including the risk score for files within the folder. In some embodiments, the risk report can include the risk score for a folder and additional data, such as the number of incidents associated with files in the folder or the DLP policies which have the highest number of incidents or violations in the folder. In some embodiments, the risk report can include the owners of the files in the folder which caused violations. In some embodiments, the risk report is displayed in a graphical user interface (GUI) viewable by a user. The risk report may be stored in risk reports store 268.

Figure 3:
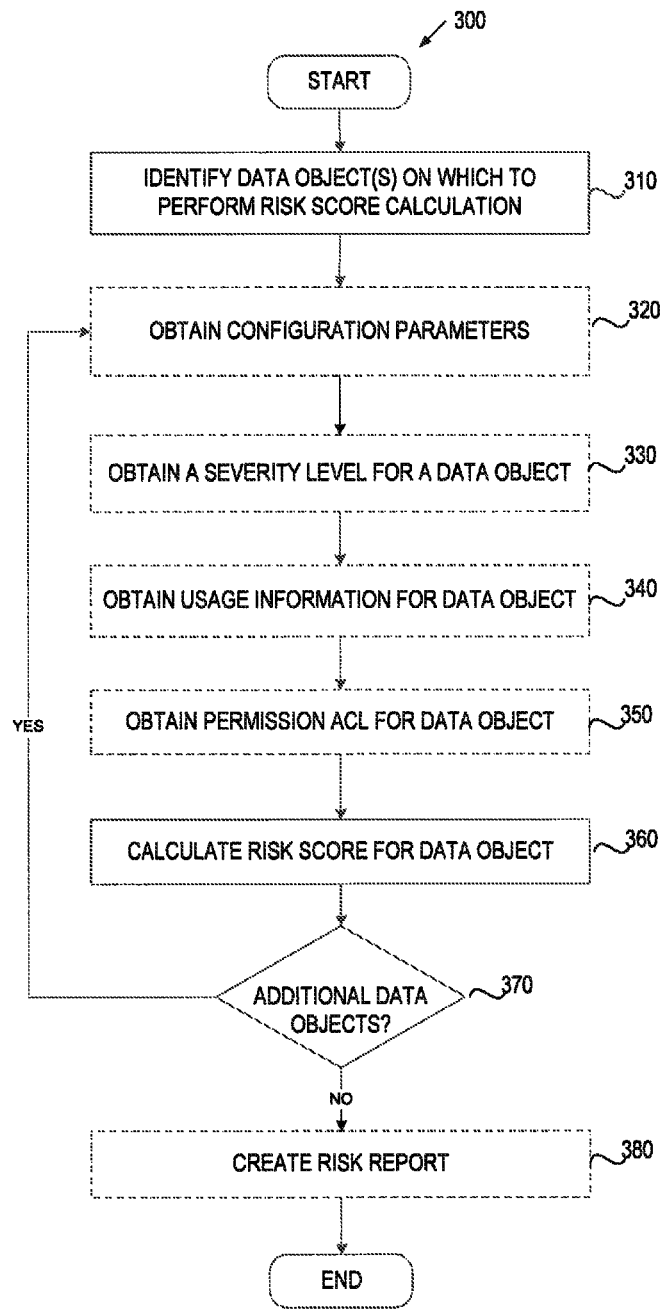
FIG. 3 is a flow diagram of one embodiment of a method for calculating a risk score for a data object.

FIG. 3 is a flow diagram of one embodiment of a method 300 for calculating a risk score for a data object. The method 300 is performed by processing logic that may comprise hardware (circuitry, dedicated logic, etc.), software (such as is run on a general purpose computer system or a dedicated machine), or a combination of both. In one embodiment, the method 300 is performed by risk calculation system 120 of FIG. 1 or risk calculation system 250 of FIG. 2B.

Referring to FIG. 3, processing logic begins by identifying a data object on which to perform the risk score calculation at block 310. In some embodiments, the data object can be identified in a request received from a user. In some embodiments, the data object can be identified in a request received at predefined times for the data object. In some embodiments, the data object can be identified in a request received when the data object is created or modified. In some embodiments, the data object can be identified in a request received when the data object triggers an incident. In some embodiments, the data object can be a folder. If the data object is a folder, the files or hazards in the folder can be identified, and a risk score can be calculated for each of the files or hazards in the folder. If hazards are identified in the folder, a file associated with each hazard may be identified. The data object on which to perform the risk calculation may be associated with a user device or reside in a centralized data repository.

At block 320, processing logic obtains configuration parameters. In some embodiments, a user can configure the configuration parameters. In some embodiments, the configuration parameters can include coefficients for the risk score calculation. For example, if a risk score calculation uses a severity level and access information to calculate the risk score, a user may set a coefficient for the severity level value to 1, and the coefficient for the access information to 0.5. In this example, the risk score calculation would be adjusted such that the full value of the severity level and only half of the value of the access information was used to calculate the risk score.

In some embodiments, the configuration parameters can determine which data is used in the calculation of the risk score. For example, the configuration parameters may be set such that only a severity level and a permission ACL of a data object are used to calculate the risk score. In another example, the configuration parameters may be set such that a severity level, an access information, and a permission ACL are used to calculate the risk score for a data object.

In some embodiments, the configuration parameters can determine the operation used to calculate the risk score. For example, the configuration parameters may be set such that the risk score is calculated using a summation of values. In another example, the configuration parameters maybe set such that the risk score is calculated using a multiplication of values.

In some embodiments, none or some of the configuration parameters are set. In these embodiments, default configuration parameters are used. For example, the default set of configuration parameters can be that the risk score is calculated using a coefficient of 1.0 for all data values, using the data values for the severity level, the access information, and the permission ACL, and summing the data values. In certain embodiments, block 320 is optional and is not performed. In certain embodiments, if block 320 is omitted, method 300 proceeds to block 330 after block 310 is performed.

At block 330, a severity level is obtained for a data object. In some embodiments, the severity level can be obtained from a data loss prevention system. In some embodiments, the number of incidents for a data object is obtained along with the severity level for the data object. In certain embodiments, block 330 is optional and is not performed. In certain embodiments, if block 330 is omitted, method 300 proceeds to block 340 after block 320 is performed.

At block 340, access information is obtained for a data object. In some embodiments, the access information can be obtained from a data permission and access system. In some embodiments, the access information for a data object can represent a number of times that the data object or its content has been accessed by one or more users during a predetermined amount of time. In some embodiments, the access information for a data object can represent a number of users who have accessed the document or its content over a predetermined amount of time. In one embodiment, the predetermined amount of time is configurable by a user. In certain embodiments, block 340 is optional and is not performed. In certain embodiments, if block 340 is omitted, method 300 proceeds to block 350 after block 330 is performed.

At block 350, a permission ACL associated with a data object is obtained. In some embodiments, the permission ACL information can be obtained from a data permission and access system. In some embodiments, the permission ACL for a data object can specify a number of users who are permitted to access the document or its contents. In certain embodiments, block 350 is optional and is not performed. In certain embodiments, if block 350 is omitted, method 300 proceeds to block 360 after block 340 is performed.

At block 360, a risk score is calculated for the data object. In some embodiments, the calculation of the risk score for the data object may be adjusted based on the configuration parameters obtained at block 320. The adjustment of calculating a risk score based on configuration parameters is described below in conjunction with FIG. 4. In some embodiments, using the severity level for the data object and the additional data for the data object, a risk score can be calculated for the data object. In some embodiments, the risk score may be calculated by performing a calculation on the severity level and the additional data. In other embodiments, the risk score may be calculated by performing a calculation on a component of risk due to the severity level and a component of risk due to the additional data. In these embodiments, the component of risk due to the severity level may be assigned based on the number of incidents associated with the data object and the severity level of each of the incidents. In these embodiments, the component of risk due to the number of accesses may be assigned based on the number of users accessing the data object over a predetermined time period (e.g., past 7 days, past 10 days, etc.). In these embodiments, the component of risk due to the permission ACL may be the number of unique users allowed access in the permission ACL. In some embodiments, the risk score may be calculated by summing the severity level and the additional data. For example, the risk score may be calculated as:

$$\text{risk score} = \text{severity level} + \text{number of accesses} + \text{permission ACL}.$$

In some embodiments, the risk score may be calculated by summing the component of risk due to the severity level and the component of risk due to the additional data. For example, the risk score may be calculated as:

$$\text{risk score} = R(S) + R(H) + R(P),$$

where $R(S)$ is the component of risk due to the number and severity of incidents, $R(H)$ is the component of risk due to the number of accesses, and $R(P)$ is the component of risk due to the permission ACL.

In other embodiments, the risk score may be calculated by multiplying the severity level and the additional data. For example, the risk score may be calculated as:

$$\text{risk score} = \text{severity level} * (\text{number of accesses} + \text{permission ACL}).$$

In some embodiments, the risk score may be calculated by multiplying the component of risk due to the severity level with the component of risk due to the additional data. For example, the risk score may be calculated as:

$$\text{risk score} = R(S) * (R(H) + R(P)).$$

At block 370, a determination is made of whether there are additional data objects that require a calculation of a risk score. The determination can be positive if the risk score is to be calculated for a folder, and there are additional files in the folder that require a calculation of a risk score. The determination can be negative if the risk score has been calculated for a single data object. If the data object is a folder, the determination can be negative if each file in the folder has a calculated risk score. If there are additional data objects that require a calculation of a risk score, the method 300 proceeds to block 320 to identify the next data object on which to perform the calculation. If there are no additional data objects, the method 300 proceeds to block 380.

At block 380, a risk report is created using the risk score for a data object. In some embodiments, the risk report can include the risk score for the data object(s) obtained at block 310. In some embodiments, the risk report can normalize the risk scores for the data objects included in the risk report. For example, the highest risk score included in the risk report can be set to a value of 100, and the other risk scores are normalized to a scale of 1-100 based on a comparison with the highest risk score. In some embodiments, if the data object is a folder, the risk report can include the risk score for the folder without including the risk score for files within the folder. In some embodiments, if the data object is a folder, the risk report can include the risk score for the folder and additional data, such as the number of incidents associated with files in the folder or the DLP policies which have the highest number of incidents or violations in the folder. In some embodiments, the risk report can include the owner of the data object which caused an incident. In some embodiments, the risk report is displayed in a GUI viewable by a user.

Figure 4:
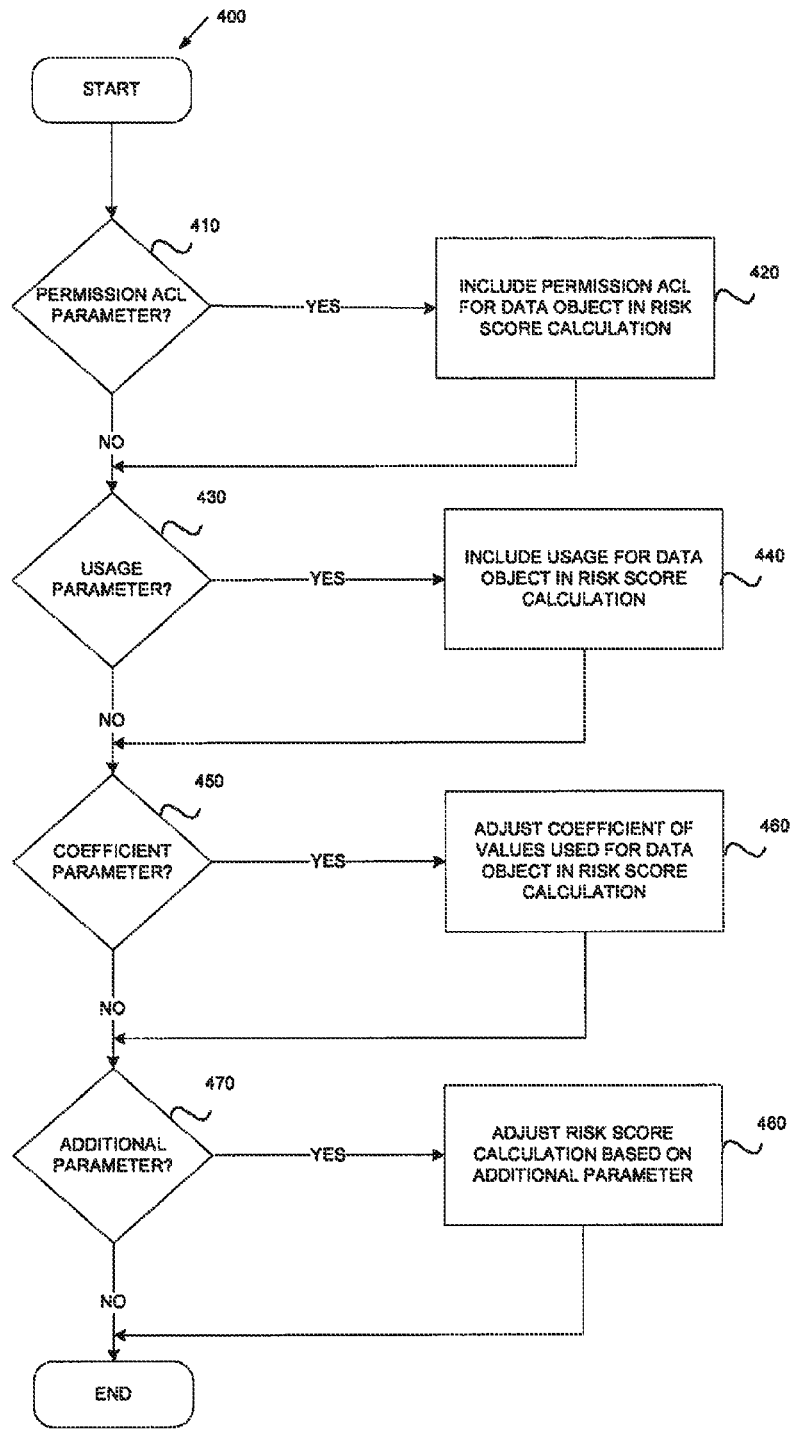
FIG. 4 is a flow diagram of one embodiment of a method for adjusting the calculation of a risk score for a data object based on configuration parameters.

FIG. 4 is a flow diagram of one embodiment of a method 400 for adjusting the calculation of a risk score for a data object based on configuration parameters. The method 400 is performed by processing logic that may comprise hardware (circuitry, dedicated logic, etc.), software (such as is run on a general purpose computer system or a dedicated machine), or a combination of both. In one embodiment, the method 400 is performed by risk calculation system 120 of FIG. 1 or risk score calculator 262 of FIG. 2.

Referring to FIG. 4, processing logic begins at block 410 to determine if a permission ACL parameter is on (e.g., value of 1) in configuration parameters for the risk score calculation. If the permission ACL parameter is on, processing logic proceeds to block 420. If the permission ACL parameter is off (e.g., value of 0), processing logic proceeds to block 430.

At block 420, the permission ACL for the data object is included in the risk score calculation because the permission ACL parameter was on. For example, the risk score calculation may be:

risk score=severity level+permission ACL; or risk score=severity level*permission ACL.

At block 430, a determination is made of whether the access parameter is on (e.g., value of 1) in configuration parameters for the risk score calculation. If the access parameter is on, processing logic proceeds to block 440. If the access parameter is off (e.g., value of 0), processing logic proceeds to block 450.

At block 440, the access for the data object is included in the risk score calculation because the access parameter was on. For example, the risk score calculation may be:

risk score=severity level+number of accesses; or risk score=severity level*number of accesses.

In another example, if the access parameter was determined to be set at block 430, the risk score calculation may be:

risk score=severity level+permission ACL+number of accesses; or risk score=severity level*permission ACL*number of accesses.

At block 450, a determination is made of whether the configuration parameters include a coefficient parameter for the risk score calculation. If a coefficient parameter is included, processing logic proceeds to block 460. If a coefficient parameter is not included, processing logic proceeds to block 470.

At block 460, one or more coefficients of values used for the data object in calculating the risk score are adjusted. For example, if the risk score calculation includes data object values for severity level, permission ACL, and access information, and the configuration parameters include a coefficient for severity level equal to 1.0 and a coefficient for access equal to 0.5, the risk score may be calculated as:

risk score=(1.0*severity level)+(0.5*number of accesses)+permission ACL.

In some embodiments, if a coefficient parameter is set, but the corresponding value is not set to be used in the calculation (e.g., a coefficient parameter of 1.0 is set for access, but the access value is not set to be included in the risk score), the coefficient parameter may not be used.

At block 470, a determination is made of whether there are any additional configuration parameters set for the risk score calculation. If additional configuration parameters are set for the risk score calculation, the method 400 proceeds to block 480. If there are no additional configuration parameters set for the risk score calculation, the method 400 ends.

At block 480, the risk score calculation is adjusted based on the additional parameter. In one embodiment, the additional parameter may be a type of operation to use in calculating the risk score. In some embodiments, the additional parameter may include more than one type of operation to use in calculating the risk score. In some embodiments, the operation to be used in calculating the risk score may be a sum of data values associated with the data object. In some embodiments, the operation to be used in calculating the risk score may be a product of data values associated with the data object. The risk score calculation can be adjusted to use the type of operation specified by the additional parameter to calculate the risk score. For example, if the type of operation is set to a summation, the risk score calculation may be:

risk score=severity level+permission ACL.

In another example, if a first type of operation is set to a summation and a second type of operation is set to a product, the risk score calculation may be:

risk score=severity level+permission ACL*number of accesses.

Figure 5:
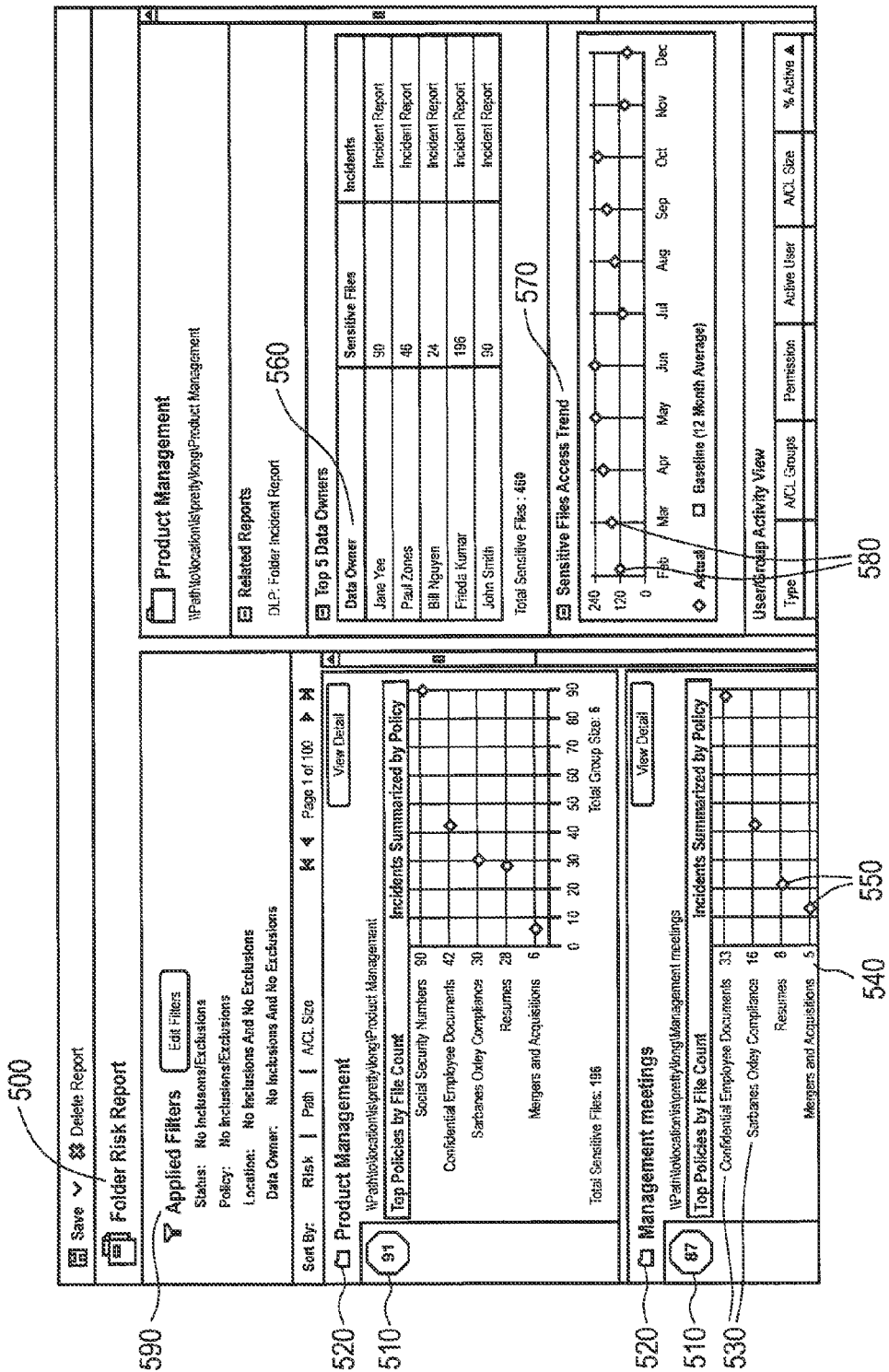
FIG. 5 illustrates an exemplary GUI for presenting a risk report in accordance in accordance with one embodiment of the invention.

FIG. 5 illustrates an exemplary GUI for presenting a risk report, in accordance with one embodiment of the invention. Such a GUI can be presented by user interface module 270. In this example, GUI presents a risk report 500 showing a list of folders 520 and a risk summary for each folder 520. In some embodiments, the risk report may also include additional data for a folder 520.

In the embodiment shown, each folder 520 has an associated risk score 510 calculated as described above. The user interface module 270 can retrieve the risk scores 510 from the risk scores store 122 maintained by the risk calculation system. In one embodiment, the listing of the folders is sorted by risk score 510, with folders having the highest risk scores 510 being displayed at the top of the list. In some embodiments, the sorting of the list is configurable by user input. For example, in GUI 500, a user can select "Path" or "ACL Size," on which to sort instead. Other sort options can be provided in other embodiments.

In one embodiment, each folder includes a risk summary in the form of a plot chart showing the top policies violated by the folder. In other words, the GUI 500 includes a graph representing the policies having the most associated incidents for each folder. One or more DLP policies 530 violated in the folder 520 may be listed. A number of files 540 violating the DLP policies 530 within the folder 520 may also be included in the risk report. A number of incidents 550 associated with a file in folder 520 may be included in the risk report.

When the user selects one of the folders from the listing of folders (shown in the left side of the GUI 500 display) one or more graphical reports and displays are generated for the selected folder (shown in the right side of the GUI 500 display). In one embodiment, these graphical reports include a data owner table 560 showing the data owners owning the highest number of sensitive files in the folder. The data owner table 560 can associate each data owner included with an incident report link that provides detailed views of the incidents associated with the sensitive files owned by the associated data owner.

In one embodiment, the graphical reports also include a sensitive files access trend graph 570. In one embodiment, the access trend graph visually illustrates the number of users 580 accessing sensitive files in the folder over time. In the GUI 500 shown, accesses statistics are broken out by month over a one year period. In other embodiments, other access statistics over time can be represented by the access trends graph 570, GUI 500 will be described in more detail in conjunction with the description related to FIG. 6.

Figure 6:
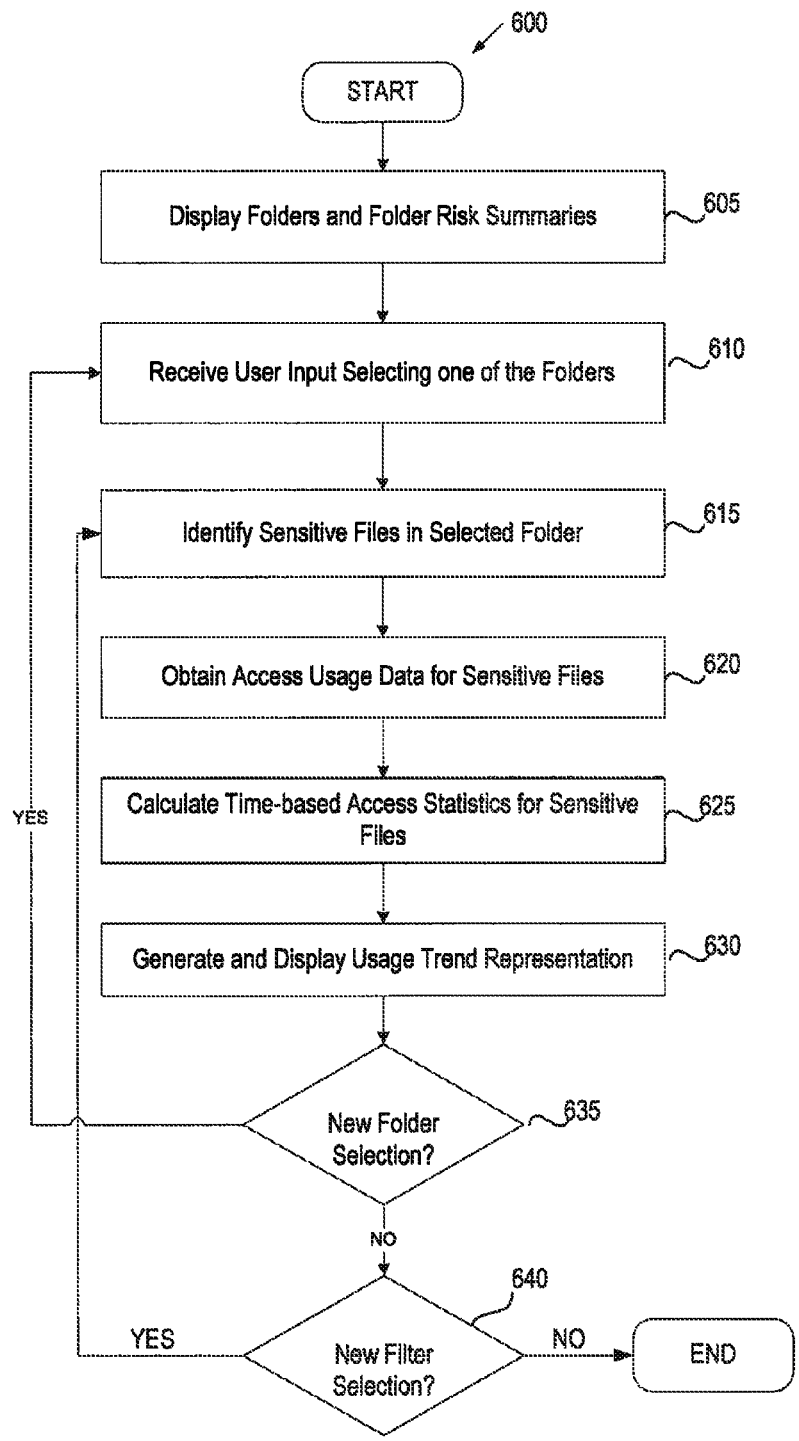
FIG. 6 is a flow diagram of one embodiment of a method for graphically illustrating a usage trend for sensitive files.

FIG. 6 is a flow diagram of one embodiment of a method 600 for graphically illustrating a usage trend to a user. The method 600 is performed by processing logic that may comprise hardware (circuitry, dedicated logic, etc.), software (such as is run on a general purpose computer system or a dedicated machine), or a combination of both. In one embodiment, the method 600 is performed GUI 270 of FIG. 2A in combination with other systems, such as data permission and access system 104 and data loss prevention system 112.

Referring to FIG. 6, processing logic begins at block 605 with the displaying of a list or folders in a GUI. The folders can be listed according to a user-configured sort criterion, such as risk (most at-risk folders first), ACL size (most-accessible folders first), or other such sorting criteria. In one embodiment, each folder listing includes a risk summary, which can include a risk score for the folder, a listing of the top DLP policy violations in the folder, and a graphical representation of the number of incidents associated with the most-violated DLP policies.

At block 610, a user input is received selecting one of the folders in the displayed listing. In one embodiment, a user-selection of the first folder in the list is implied, and the top folder is automatically selected until another user selection is received at block 610. The user input can be a user clicking a mouse or touching a touch screen on a folder or anywhere in the risk summary of the folder, or any other such user selection indication.

At block 615, the sensitive files in the folder are identified. This processing can be performed by the data object scanner 114 of the DLP system 112, using the rules in the DLP policies to identify sensitive data contained in the files of the folder. In one embodiment, block 615 has been already performed during the calculation of the risk score for the folder. In such an embodiment, identifying the sensitive files can be accomplished by retrieving the risk report associated with the selected folder from the risk reports store 124 of the risk calculation system 120.

At block 620, access usage data for the identified sensitive files of the folder is obtained. This information can be retrieved from the number of accesses stores 108 maintained by the data permission and access system 104. In one embodiment, access usage data may include all accesses for all the identified sensitive files in the folder and the timestamp and user associated with each access. The access usage data can be limited by some time range, such as one year.

At block 625, time-based access statistics are calculated for the sensitive files in the folder. In one embodiment, the time-based statistic calculated for each sensitive file is the number of unique users per month who access the file over the past year. In another embodiment, the time-based statistic calculated for each sensitive file is the number of accesses of the file per month over the past year. If such time-based statistics are already maintained for the files by the data permissions and access system 104, then in block 625 such statistics can be directly retrieved from—for example—the number of accesses store 108.

In block 630, a usage trend representation is generated and displayed in the GUI. The usage trend representation can visually illustrate the calculated time-based access statistics for the sensitive files in the folder to a user. In one embodiment, the usage trend representation is a graph. The graph can be generated by graph module 272 of the user interface 270.

One embodiment of such a usage trend representation is shown in FIG. 5 as the sensitive files access trend graph 570. The graph provides a diamond-shaped indicator showing the number of users that accessed sensitive files for any given month over a one year period of time. In other embodiments, other visual representations and graphs can be used, such as a bar graph, a line graph, a histogram, a pie chart, or any other visual data representation technique.

Displaying such a usage trend representation in a GUI to a user enables the user to quickly notice unusual access patterns and/or to identify ACL looseness or redundancy. For example, if the user notices a permanent drop in accesses to sensitive files in a folder, then it may be time to review the ACL for those files or for the folder in general.

In block 635, a determination is made whether a new folder has been selected by the user. If a new folder has been selected, then processing returns to block 610 with the reception of the file selection input. The usage trend representation is then regenerated for the newly selected file as described with reference to blocks 615-630.

If no new folder selection is detected at block 635, then processing continues at block 640 with the determination whether there has been a new filter selection made by the user. In one embodiment, the GUI exposes several filter options to the user. For example, GUI 500 has applied filters 590 showing the filters applied to the data represented in the GUI 500. By selection the "Edit Filters" input, the user can edit the filters using a filter editor. As shown in FIG. 5, some example filters can be status, policy, location, and data owner. For example, a user may elect to filter for a single DLP policy, or a set of DLP policies—such as HIPAA policies, or IT policies.

If at block 640 it is determined that the filter selections have been changed, then processing returns to block 615 to identify the sensitive files in the folder according to the new filter criteria. For example, is a DLP policy is excluded by the policy filter, then the rules of that policy will not be used to scan the folder to identify sensitive information. In one embodiment, the folder is not re-scanned when the filter is changed. Instead, the incidents associated with the excluded DLP policies are not counted when identifying the sensitive files in the folder. Once the newly filtered sensitive files are identified, processing continues at blocks 620-630 as described above. The filtering display and processing can be implemented for example by a filter module 276 of the user interface 270 as shown in FIG. 2A.

In the GUI 500 shown in FIG. 5, no filters are applied. In one embodiment, when filters are applied, the usage trend representation includes a baseline access marker in addition to the usage trend markers. For example, if the filter is "HIPAA Policies Only," then the usage trend representation will, in one embodiment, shown the number of users accessing files in the folder containing sensitive data as defined by the HIPAA policies. Another indication—such as another color on a bar graph, a line, or a different shape on a plot chart—can show the baseline access trend for the folder, which, in one embodiment, is the number of users accessing files in the folder containing sensitive data as defined by all (unfiltered) policies. Similar baselining can be applied to any other filter or to a combination of filters.

In addition to the usage trend representation, in one embodiment, the user interface 270 also includes a graph module 274 configured to generate and display a data owner table 560 to the user. One embodiment of the data owner table 560 is shown in the GUI 500 in FIG. 5. The data owner table 650 associates the data owners with the number of identified (in block 615) sensitive files they own, and a link to an incident report having more details on the incidents associated with those sensitive files owned by the data owner, in one embodiment, the data owner table only displays the top data owners; those data owners owning the most files. The number or top data owners displayed can be user-configurable, set at a fixed number between 5-10, or any other number.

The owners of files are sometimes known and records associating the owners with files can be maintained by the data permission and access system 104. However, for some files there may not be a file owner declared. In one embodiment, the data permission and access system 104 automatically determines an owner for each sensitive file by assigning the identity with the most accesses to a file as the file owner. The file access count can be limited by time, such as the person accessing the file the most in the last year.

Figure 7:
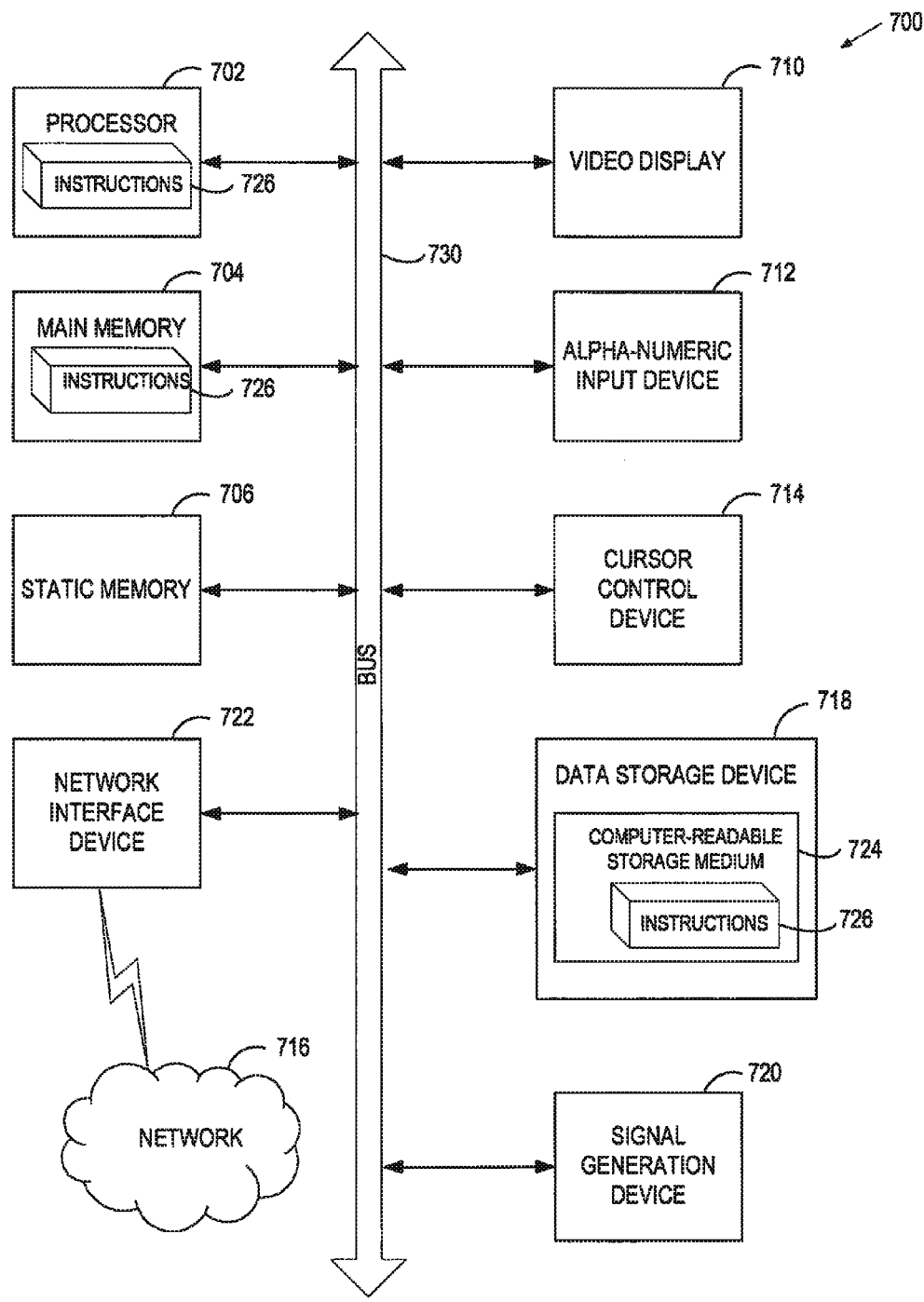
FIG. 7 is a block diagram of an exemplary computer system ha may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations, methods, and processing discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable medium 724 on which is stored one or more sets of instructions (e.g., software 726) embodying any one or more of the methodologies or functions described herein. The software 726 may also reside, completely or at least partially, within the main memory 704 and/or within the processor 702 during execution thereof by the computer system 700, the main memory 704 and the processor 702 also constituting computer-readable media. The software 726 may further be transmitted or received over a network 716 via the network interface device 722.

While the computer-readable medium 724 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, optical media, and magnetic media.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "applying", "refraining", "scanning", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. As discussed above, such a computer program may be stored in a computer readable medium.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   receiving, in a graphical user interface (GUI), a first user input indicating a selection of one folder from a plurality of folders;
   identifying a plurality of sensitive files in the selected folder using one or more data loss prevention policies;
   obtaining access usage data for the plurality of sensitive files, the access usage data comprising access information for each of the plurality of sensitive files;
   determining a number of users accessing the sensitive files within a plurality of time intervals using the access usage data; and
   displaying, in the GUI, a usage trend representation comprising a visual illustration of the number of users accessing the sensitive files within each of the plurality of time intervals.

2. The method of claim 1, wherein the plurality of time intervals comprise months, and wherein the usage trend representation visually illustrates the number of users accessing the sensitive files per month.

3. The method of claim 2, wherein the usage trend representation has a range of one year.

4. The method of claim 1, wherein the usage trend representation comprises a graph.

5. The method of claim 1, further comprising:
   receiving a second user input indicating the selection of one or more filter criteria;
   filtering the plurality of sensitive files according to the one or more filter criteria;
   re-determining the number of users accessing the filtered sensitive files within a plurality of time intervals using the access usage data; and
   displaying, in the GUI, a usage trend representation comprising a visual illustration of the number of users accessing the filtered sensitive files within each of the plurality of time intervals.

6. The method of claim 5, wherein the usage trend representation further includes a baseline access trend indication visually illustrating the average number of users accessing the unfiltered sensitive files.

7. The method of claim 1, wherein identifying the plurality of sensitive files in the selected folder using one of more data loss prevention policies comprises using a data loss prevention (DLP) system to scan the selected folder using data sensitivity rules of the one or more data loss prevention policies.

8. The method of claim 1, wherein obtaining access usage data for the sensitive files comprises retrieving the access usage data from a data permission and access system.

9. The method of claim 1, further comprising identifying one or more data owners that own the most number of sensitive files in the plurality of sensitive files.

10. The method of claim 9, further comprising displaying, by the GUI, a visual association of each of the identified one or more data owners with the number of sensitive files owned by each identified data owner.

11. The method of claim 9, further comprising displaying, by the GUI, a visual association of each of the identified one or more data owners with a link to an incident report providing information about policy violations associated with sensitive files owned by an identified data owner.

12. The method of claim 1, further comprising displaying, in the GUI, the plurality of folders sorted by a risk score associated with each folder in the plurality of folders.

13. The method of claim 12, further comprising displaying, in the GUI, a risk summary associated with each folder in the plurality of folders, each risk summary including a graphical representation of the numbers of violations of the one or more data loss prevention policies by files contained in the folder.

14. A non-transitory computer readable storage medium that provides instructions, which when executed on a computer system cause the computer system to perform operations comprising:
   receiving, in a graphical user interface (GUI), a first user input indicating a selection of one folder from a plurality of folders;
   identifying a plurality of sensitive files in the selected folder using one or more data loss prevention policies;
   obtaining access usage data for the plurality of sensitive files, the access usage data comprising access information for each of the plurality of sensitive files;
   determining a number of users accessing the sensitive files within a plurality of time intervals using the access usage data; and
   displaying, in the GUI, a usage trend representation comprising a visual illustration of the number of users accessing the sensitive files within each of the plurality of time intervals.

15. The non-transitory computer readable storage medium of claim 14, wherein the plurality of time intervals comprise months, and wherein the usage trend representation visually illustrates the number of users accessing the sensitive files per month.

16. The non-transitory computer readable storage medium of claim 14, wherein the operations performed by the computer system further comprise:
receiving a second user input indicating the selection of one or more filter criteria;
filtering the plurality of sensitive files according to the one or more filter criteria; and
re-determining the number of users accessing the filtered sensitive files within a plurality of time intervals using the access usage data; and
displaying, in the GUI, a usage trend representation comprising a visual illustration of the number of users accessing the filtered sensitive files within each of the plurality of time intervals.

17. The non-transitory computer readable storage medium of claim 14, wherein the operations performed by the computer system further comprise identifying one or more data owners that own the most number of sensitive files in the plurality of sensitive files, and displaying, by the GUI, a visual association of each of the identified one or more data owners with the number of sensitive files owned by each identified data owner.

18. A system, comprising:
a memory; and
a processing device coupled with the memory to
receive, in a graphical user interface (GUI), a first user input indicating a selection of one folder from a plurality of folders;
identify a plurality of sensitive files in the selected folder using one or more data loss prevention policies;
obtain access usage data for the plurality of sensitive files, the access usage data comprising access information for each of the plurality of sensitive files;
determine a number of users accessing the sensitive files within a plurality of time intervals using the access usage data; and
display, in the GUI, a usage trend representation comprising a visual illustration of the number of users accessing the sensitive files within each of the plurality of time intervals.

19. The system of claim 18, wherein the processing device is further to:
receive a second user input indicating the selection of one or more filter criteria;
filter the plurality of sensitive files according to the one or more filter criteria; and
re-determine the number of users accessing the filtered sensitive files within a plurality of time intervals using the access usage data; and
display, in the GUI, a usage trend representation comprising a visual illustration of the number of users accessing the filtered sensitive files within each of the plurality of time intervals, wherein the usage trend representation further includes a baseline access trend indication visually illustrating the average number of users accessing the unfiltered sensitive files.

20. The system of claim 18, wherein the processing device identifies the plurality of sensitive files in the selected folder by using a data loss prevention (DLP) system to scan the selected folder using data sensitivity rules of the one or more data loss prevention policies, and wherein the processing device obtains access usage data for the sensitive files by retrieving the access usage data from a data permission and access system.

\* \* \* \* \*